United States Patent
Scalzi et al.

(10) Patent No.: US 8,147,694 B2
(45) Date of Patent: Apr. 3, 2012

(54) METHOD FOR THE TREATMENT OF GROUND WATER AND SOILS USING MIXTURES OF SEAWEED AND KELP

(75) Inventors: Michael Scalzi, Doylestown, PA (US); Jessica McGill, Doylestown, PA (US)

(73) Assignee: Innovative Environmental Technologies, Inc., Pipersville, PA (US)

( * ) Notice: Subject to any disclaimer, the term of this patent is extended or adjusted under 35 U.S.C. 154(b) by 314 days.

(21) Appl. No.: 12/561,400

(22) Filed: Sep. 17, 2009

(65) Prior Publication Data
US 2011/0008876 A1 Jan. 13, 2011

Related U.S. Application Data

(60) Provisional application No. 61/224,509, filed on Jul. 10, 2009.

(51) Int. Cl.
*C02F 3/00* (2006.01)

(52) U.S. Cl. ........ 210/610; 210/611; 210/631; 210/757; 210/747.7; 210/747.8

(58) Field of Classification Search .......... 210/610–611, 210/631, 747, 757, 747.7, 747.8
See application file for complete search history.

(56) References Cited

U.S. PATENT DOCUMENTS

| 4,666,606 A | * | 5/1987 | Heinicke | 210/632 |
| 6,146,531 A | * | 11/2000 | Matheson | 210/606 |
| 2005/0263454 A1 | * | 12/2005 | Sorenson, Jr. | 210/610 |
| 2011/0139713 A1 | * | 6/2011 | Schur | 210/610 |

OTHER PUBLICATIONS

US EPA, "Engineering Approaches to In Situ Bioremediation of Chlorinated Solvents: Fundamentals and Field Applications," EPA 542-R-00-008 (Jul. 2000).*

* cited by examiner

*Primary Examiner* — Chester Barry
(74) *Attorney, Agent, or Firm* — Gregory J. Gore

(57) ABSTRACT

The induction of reducing conditions and stimulating anaerobic process through the addition of species of seaweed (Dulse, Nori, *Ascophyllum nodosum*, and Kelp) to accomplish accelerated dechlorinization of soil and groundwater contaminated with chlorinated solvents and heavy metals.

17 Claims, No Drawings

US 8,147,694 B2

METHOD FOR THE TREATMENT OF GROUND WATER AND SOILS USING MIXTURES OF SEAWEED AND KELP

RELATED APPLICATION

This patent application is a non-provisional of provisional patent application Ser. No. 61/224,509 entitled "Method for the Treatment of Ground Water and Soils Using Mixtures of Seaweed and Kelp" filed on Jul. 10, 2009, priority from which is hereby claimed.

FIELD OF THE INVENTION

The present invention relates to the mediation of subsurface soil and ground water contamination. Specifically, it relates to the injection of dried seaweed, kelp and or other mixtures for the dechlorination of soil and ground water contaminated with chlorinated solids.

BACKGROUND OF THE INVENTION

This invention aids in the remediation of environmental contaminants in subsurface soils and groundwater via the stimulation of anaerobic processes. Specifically, this invention relates to remediation processes involving the emplacement of solid-phase or aqueous-phase treatment agents. Emplacement of dried seaweed or kelp species as electron donors for microorganisms that carry out reductive dechlorination of chlorinated solvent source areas or plumes is illustrative of the invention.

Various species of Seaweed including *Ascophyllum nodosum*, Dulse, Nori, and Kelp contain substantial nutrients, beneficial to anaerobic processes. Seaweeds are available in a variety of forms including sheets, meals, flakes and powders that can either be hydrolyzed for solubility or remain insoluble as a slow release remedial product. In addition, dried seaweed can come in various sizes ranging from large granules characteristic of insoluble kelp meal to high mesh sizes of fine powder. The dynamic nature of seaweed has resulted in its wide use in varying commercial fields. Liquid seaweed extract as well as insoluble and (hydrolyzed) soluble dried seaweeds are commonly used as fertilizers to enhance the development and growth rate of plants. Seaweed is also used as a food additive for livestock to promote growth and health. Furthermore, seaweed has been an essential food source for years, used in sushi, chips, seasoning, and even as a dietary supplement for its high nutritional value.

The chemical composition of seaweeds allows for the contribution of stimulating is comprised of fatty acids, carbohydrates, and proteins. Their concentrations of vitamins B2, and B12 in particular make seaweed an excellent alternative for environmental remediation. The species *Ascophyllum nodosum* contains high levels of enzymes, 17 amino acids, macro and micronutrients, plant hormones (auxins, cytokins, gibberillins), 25% alginic acid, and over 50% of carbohydrates and polysaccharides. Seaweeds also have over 72 minerals, and assorted vitamins (B2, B12, K) that encourage the vigorous and healthy growth of subsurface biological life. Seaweed and Kelp offer the necessary micronutrients and volatile fatty acid precursors that will provide long-term production of organic hydrogen necessary for reductive dechlorination of chlorinated solvents in groundwater and soils. The high concentrations of many of these valuable nutrients provide optimal living conditions for the anaerobic processes responsible for the remediation of contaminated soil and groundwater sites.

Chlorinated solvents are the most common class of ground water contaminants at hazardous waste sites in the U.S. In a list of the top 25 most frequently detected contaminants at such sites, the Agency for Toxic Substances and Disease Registry (ATSDR) found that 10 of the top 20, including two of the top three, were chlorinated solvents or their degradation products. National Research Council, Alternatives for Ground Water Cleanup (National Academy Press, Washington, D.C. 1994). In fact, the same survey found that the most common contaminant, trichloroethylene (TCE), is present in more than 40% of National Priority List sites. The remediation of ground water contaminated by these compounds often presents unique obstacles related to their inherent characteristics, including hydrophobicity and high density. Many commercial process utilize raw vegetable oils and emulsions which co-elute the targeted solvents within the treatment liquid masking the presence of the compound targeted for treatment rather than stimulating the mineralization of said compound.

Natural attenuation of chlorinated solvents by reductive dechlorination often occurs at sites where an electron donor (food source or substrate for microbes) is present along with the chlorinated solvent contamination. As dissolved oxygen and other electron acceptors become depleted some microbes are capable of using the chlorinated solvents as electron acceptors. For selected compounds such as chlorinated ethylenes sequential dechlorination to a harmless byproduct ethylene can be achieved under favorable environmental conditions (EPA/600/R-10 98/128 September 1998).

In recent years efforts have been made to produce this anaerobic treatment effect by injection of electron donor into the subsurface. An overview of these technologies can be reviewed in the EPA document Engineered Approaches to In Situ Bioremediation of Chlorinated Solvents: Fundamentals and Field Applications (EPA 542-R-00-008 July 2000). Other inorganic and organic compounds can be degraded or immobilized under anaerobic conditions including selected toxic metals, nitrate, and MTBE. For sites that do not have sufficient amounts of natural electron donors to drive anaerobic natural attenuation, injection of microbial substrates has proven to be a cost-effective treatment or plume migration control measure. The microbial substrates can be injected into the contaminant source area where residual contamination is adsorbed onto soils or injected in a line across a ground water contaminant plume to form a permeable reactive wall to prevent further contaminant migration.

A wide variety of sugars, alcohols, organic acids, and even molecular hydrogen have been used successfully as electron donors to enhance anaerobic biotransformation processes. Most of these compounds are rapidly consumed after injection and must be replaced by either continuous low concentration delivery systems or with frequent batch additions of additive solution. Contaminant source areas can not be effectively removed or even precisely located for many ground water contaminant plumes. The presence of residual chlorinated solvents adsorbed onto soils or present as dense non-aqueous phase product (DNAPL) serves as an example of persistent ground water plume source areas that can last for many decades. These persistent contaminant source areas continue to contaminate ground water for many years such that continuous operation of recirculation systems or frequent substrate injections can be very costly over the life of a project. Long-term injection of substrates into wells or infiltration galleries often leads to severe bacterial fouling problems adding to project operation and maintenance costs.

Recent interest has developed in the use of materials that slowly biodegrade or slowly release organic matter into ground water over time. A variety of vegetable oils have been demonstrated to be effective electron donors to stimulate anaerobic biodegradation. Although edible oils such as soybean oil have a much lower viscosity than a semisolid product, distribution in saturated soils is difficult. Soybean oil has a viscosity approximately times higher than water, which results in multiphase fluid flow and potential oil blockage of soil porosity. Injection of pure oil or large droplets of emulsified oil blocks soil pores producing treatment zones that are ineffective because they prevent free flow of ground water through the oil treated area. Injection of pure soybean oil into porous soil media has been shown to reduce water permeability by up to 100%.

In addition to slowly biodegradable hydrogen sources, soil and groundwater remediation process that utilize zero-valent metals have been applied with varying success. In the second embodiment of the invention, the addition of zero-valent metals to the micro dried seaweed or kelp allows for maintained reducing conditions resulting in greater longevity of the reactive metal surface. Zero-valent metal particles have been proven to effectively degrade halogenated solvents. For example, the mechanism and reaction rates of which iron reduces chlorinated aliphatics has been studied extensively due to iron's low cost and low toxicity. Additionally, the pathways of the dehalogenation of DNAPL's such as TCE have been proposed. TCE undergoes hydrogenolysis where the replacement of each of the three chlorines occurs sequentially. TCE reduces to cis-1,2-dichloroethene, trans-1,2-dichloroethene, and 1,1-dichloroethene. These intermediates in turn reduce to ethene and ethane.

SUMMARY OF THE INVENTION

To overcome the foregoing problems, the present invention utilizes dried micro-seaweed species like nori, *Ascophyllum nodosum*, and dulse. Seaweed is brown algae that is widely available in both the wild and through cultivation all over the world. The best-known species of seaweed is *Ascophyllum nodosum*. Not only is *Ascophyllum nodosum* the most popular amongst researchers, but is also the most cultivated species of seaweed. Ascophyllum nodosum is native to the northern Atlantic and has wide variety of important nutrients beneficial to anaerobic processes. *Ascophyllum nodosum* has an analyzed chemical composition of: 20 26% of sulphate uronic acids, 5 8% of Mannitol, 2 5% of Laminaran, 5 15% of fucoidin, 2500 2000 mg/kg of Ascorbic acid, 150 300 mg/kg of Tocopherols, 30 60 mg/kg of Carotenes, 10 30 mg/kg of Niacin, 0.1 0.4 mg/kg of Biotin, 0.21 mg/kg of Folic acid, 5 10 mg/kg of Riboflavine, and 15 mg/kg of Thiamine. The species also has an assortment of elements including sulfur, potassium, chlorine, sodium, magnesium, calcium, phosphorous, bromine, cobalt, copper, iron, iodine, zinc, nickel and 0.004 mg/kg of Vitamin B12, and 10 mg/kg of Vitamin K. Many of these organisms also are highly alkalizing, as a consequence their addition counter-acts the natural production of acids produced by-way of anaerobic dechlorinization. These organisms are commercially available dried, in multiple forms, and in large quantities. The dechlorination process may be further accelerated by the addition of a zero-valent metal powder to the dried seaweed. When emplaced in groundwater and soils impacted by chlorinated solvents the micro dried seaweed offer all the needed components for effective and rapid remediation of compounds such as tetrachloroethane, tetrachloroethene, trichloroethane, trichloroethene, carbon tetrachloride and their anaerobic daughter products.

The actions of seaweeds on the subsurface may be further enhanced with the inclusion of zero-valent metal particles. Alone, or in a mixture, the micro sized seaweed is particularly suited for dehalogenation of solvents including, but not limited to, tetrachloroethane, tetrachloroethene, trichloroethane, trichloroethene, carbon tetrachloride and their anaerobic daughter products. The present invention achieves accelerated dechlorination of soil and ground water contaminated with chlorinated solvents by stimulating anaerobic microorganisms and thus increasing the rate of biological mineralization of the solvents.

Overcoming these obstacles often demands innovation and an interdisciplinary approach that integrates hydrology, geology, chemistry, microbiology, and economics. In particular, an innovative approach has been conceived, and is described herein, to harness recent advances in the understanding of biodegradation processes involving chlorinated solvents for remediating residual source areas, or for cutting off dissolved plumes, by emplacing solid-phase or aqueous-phase treatment agents into a variety of soil types throughout much larger volumes of the subsurface than has been possible using conventional methods. By using micro dried seaweed or kelp, a variety of organic carbons, hydrogen sources, nutrients, and vitamins are delivered for anaerobic bacteria to digest and convert into gases like hydrogen. Specifically, the vitamins B2 and B 12 from the seaweed help mediate the reductive dechlorination of PCE and TCE completely to ethane and ethane. The rate-limiting step from which vinyl chloride converts to ethylene has been found to be significantly enhanced by the presence of vitamin B12, which acts as an electron carrier. Using micro dried seaweed or kelp as an additive aids in the completion of the dechlorination as well as providing a supply of nutrients to prolong the remedial process.

One embodiment of this innovation involves delivering powdered dried seaweed or kelp as an electron donor, into induced fractures in low permeability soils to create and maintain nutrient-rich anaerobic conditions that will promote and accelerate the long-term bioremediation of a chlorinated solvent or other dense nonaqueous phase liquid (DNAPL) sources. Individual use of hydrolyzed soluble seaweed or kelp has the ability to immediately dissolve into the ground and directly promote anaerobic processes responsible for the remediation of contaminated sites. The injection of powedered sized insoluble seaweed or kelp allows for a prolonged period of absorption that enhances and extends the anaerobic and remedial process. A second embodiment of this invention includes the addition of a zero-valent metal with the dried micro sized seaweed or kelp such that the dissolved chlorinated solvents are both biotically and abiotically degraded. Combined, these materials offer long term organic hydrogen sources, buffering capacity and essential nutrient for the sustained, biologically mediated anaerobic dechlorinization.

More specifically the invention comprises a method for accelerating biotic dechlorination of ground water and soils provided by the steps of first injecting into the ground water and soils by way of temporary rods or permanent wells a mixture containing a predetermined mass of micro dried powder seaweed or kelp put under pressure. Next, a mixture containing zero valent metal particles is injected to react with the dissolved chlorinated solvents. A second mixture containing zero valent metal particles is then injected so that the corrosion of the metal particles results in the elevation of the bulk PH of the surrounding ground water. Finally, the micro dried seaweed is again injected into the ground water and soils with an oxygen scavenger to remove oxygen and ensure that the subsurface environment is reductive. All injections of materials are done in such a matter as to ensure their dispersion into the subsurface. Alternately, a simple single step method of employing the invention is injecting a solution of zero valent iron, seaweed, and sodium sulfite into the subsurface using a pump.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DESCRIPTION OF THE PREFERRED EMBODIMENT

One embodiment of the present invention is carried out in the following steps:

Step 1: Subsurface Pathway Development

A gas is delivered to the subsurface as follows. Injection points are advanced via traditional direct push technology using injection rods or may be permanently installed injection wells. The gas is introduced at approximately 175 psi such that delivery pathways and voids are established. Pathway development is verified by observing a substantial pressure drop at the surface monitoring point. The gas is used so as not to introduce oxygen into an environment targeted for anaerobic processes.

Step 2: Sodium Sulfite and Seaweed

Next a solution of sodium sulfite and micro-dried seaweed is immediately injected into the subsurface fractures and voids that were developed during the gas injection step. Sodium sulfite acts as an oxygen scavenger, iron reducer, and sulfate source. As an oxygen scavenger, the sodium sulfite prevents the oxidation of the later-injected ZVI (Zero Valent Iron) by the dissolved oxygen while promoting anaerobic conditions that are favorable for the biodegradation of the DVOCs. the components of seaweed make it an organic hydrogen donor, with necessary vitamins and minerals.

Step 3: Zero Valent Iron (ZVI) Injection

Immediately following the sodium sulfite/seaweed solution injection, ZVI is added to an additional quantity of the micro seaweed solution and the colloidal suspension is injected to reduce concentrations of dissolved-phase CVOCs while providing for rapidly generated hydrogen for the microbial stimulation.

Step 4: Post Liquid Injection-Gas Injection

The injection lines are cleared of liquids by a second gas injection and all injectants are forced into the created formation and upward into the vadose zone. Once the injection cycle is complete, the injection point is temporarily capped to allow for the pressurized subsurface to accept the injectants. Once back-pressure diminishes, the injection rods are extracted. Injection boring locations are then sealed with bentonite or sand to prevent short-circuiting from adjacent injection locations.

The following table depicts an amount of injectants that could be used in this embodiment.

| Component | Concentration |
|---|---|
| Iron | 45% by wight |
| Blue Green Algae | 5% by weight |
| Kelp | 55% by weight |

Another embodiment of the present invention is carried out in the following steps.

Step 1: Suspension injection

A solution of zero-valent iron, micro dried seaweed powder and sodium sulfite is injected into the subsurface using a pump. The following table depicts an amount of injectants that could be used in this embodiment.

| Component | Concentration |
|---|---|
| Kelp | 45% by weight |
| Iron | 55% by weight |

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters of Patent of the United States is as follows:

1. A method for accelerated biotic dechlorination of groundwater and soils, whereby anaerobic processes are stimulated comprising the following steps of:
   delivering into the groundwater and soils via temporary rods or permanent wells a mixture containing a predetermined mass of seaweed powder under pressure;
   delivering a mixture comprising zero valent metal particles to react with dissolved chlorinated solvents in said soils so that the corrosion of said metal particles results in the elevation of the bulk pH of the surrounding groundwater; and
   delivering dried powdered seaweed or kelp in combination with an oxygen scavenger into the groundwater and soils to remove oxygen and to ensure the subsurface environment is reductive.

2. The method of claim 1 wherein the pressure is achieved via compressed gas injection or a pumped liquid injection system.

3. The method of claim 1 wherein the delivered materials are educed into the compressed gas stream.

4. The method of claim 3 wherein the delivered materials are liquid and injected by pumping.

5. The method of claim 4 wherein when the materials are pumped as a suspension.

6. The method of claim 1 wherein the zero-valent metal particles is a powder consisting of particles in a range between 100 nanometers and 500 micrometers in diameter.

7. The method of claim 3 wherein said gas is selected from the group consisting of air, nitrogen and carbon dioxide.

8. The method of claim 1 wherein the oxygen scavenger is a reducing agent.

9. The method of claim 8 wherein the reducing agent is sodium bisulfite.

10. The method of claim 1 wherein delivering the materials is achieved by dispersion into the subsurface.

11. The method of claim 1 wherein said metal particles are iron particles.

12. A method for accelerated biotic dechlorination of groundwater and soils, whereby anaerobic processes are stimulated comprising the step of:

injecting into groundwater and soils under pressure a mixture containing micro seaweed powder and zero valent metal particles.

13. The method of claim 12 wherein said metal is iron.

14. The method of claim 12 wherein the injected materials are commingled immediately prior to emplacement into the subsurface.

15. The method of claim 14 wherein the entirety of the materials are pre-packaged together as a mixture.

16. The method of claim 12 wherein the micro seaweed powder is insoluble.

17. The method of claim 16 wherein the metal particles are zero-valent iron.

\* \* \* \* \*